(12) United States Patent
Ni et al.

(10) Patent No.: US 11,521,087 B2
(45) Date of Patent: Dec. 6, 2022

(54) METHOD, ELECTRONIC DEVICE, AND COMPUTER PROGRAM PRODUCT FOR PROCESSING INFORMATION

(71) Applicant: EMC IP Holding Company LLC, Hopkinton, MA (US)

(72) Inventors: Jiacheng Ni, Shanghai (CN); Zijia Wang, Shanghai (CN); Min Gong, Shanghai (CN); Pengfei Wu, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 350 days.

(21) Appl. No.: 16/983,051

(22) Filed: Aug. 3, 2020

(65) Prior Publication Data

US 2021/0406730 A1     Dec. 30, 2021

(30) Foreign Application Priority Data

Jun. 30, 2020    (CN) .......................... 202010621888.6

(51) Int. Cl.
     *G06F 3/048*      (2013.01)
     *G06N 5/04*      (2006.01)
     (Continued)

(52) U.S. Cl.
     CPC ........... *G06N 5/04* (2013.01); *G06F 16/2379* (2019.01); *G06F 40/279* (2020.01); *G06N 20/00* (2019.01)

(58) Field of Classification Search
     CPC ...... G06N 5/04; G06N 20/00; G06F 16/2379; G06F 40/279
     See application file for complete search history.

(56) References Cited

U.S. PATENT DOCUMENTS 9,245,232 B1 *   1/2016   Trautmann .......... G06F 16/9574
10,019,716 B1 *   7/2018   Ainslie ................ G06Q 30/016
(Continued)

FOREIGN PATENT DOCUMENTS

CN      110363556 A   *   10/2019
CN      112053703 A   *   12/2020     ............. G10L 25/51
(Continued)

OTHER PUBLICATIONS

J. Devlin et al., "BERT: Pre-training of Deep Bidirectional Transformers for Language Understanding," arXiv:1810.04805v2, May 24, 2019, 16 pages.
(Continued)

*Primary Examiner* — Rashawn N Tillery
(74) *Attorney, Agent, or Firm* — Ryan, Mason & Lewis, LLP

(57) ABSTRACT

Embodiments of the present disclosure relate to a method, an electronic device, and a computer program product for processing information. According to an example embodiment, the method includes: acquiring a service request record set, each service request record in the service request record set relating to a problem encountered by a user when the user is provided with a service and a solution to the problem; constructing a language model based on a first subset in the service request record set and an initial model, the initial model being trained using a predetermined corpus and configured to determine vector representations of words and sentences in the corpus; and constructing a classification model based on a second subset in the service request record set and the language model, the classification model being capable of determining a solution to a pending problem, and the first subset being different from the second subset.

20 Claims, 9 Drawing Sheets

(51) Int. Cl.
  *G06F 40/279* (2020.01)
  *G06N 20/00* (2019.01)
  *G06F 16/23* (2019.01)

(56) References Cited

U.S. PATENT DOCUMENTS

| | | | |
|---|---|---|---|
| 10,410,219 B1* | 9/2019 | El-Nakib | G06F 16/90332 |
| 11,004,005 B1* | 5/2021 | Sirois | G06N 5/045 |
| 11,388,244 B1* | 7/2022 | Ni | G06F 11/0709 |
| 2018/0253735 A1* | 9/2018 | Bedoun | G06N 7/005 |
| 2019/0034937 A1* | 1/2019 | Zhang | G06N 5/022 |
| 2019/0286486 A1* | 9/2019 | Ma | G06F 9/524 |
| 2020/0241861 A1* | 7/2020 | Zhang | G06F 8/70 |
| 2021/0142212 A1* | 5/2021 | Li | G06N 20/00 |

FOREIGN PATENT DOCUMENTS

| | | | |
|---|---|---|---|
| CN | 108958939 B | * 12/2021 | G06F 9/5027 |
| CN | 113868368 A | * 12/2021 | G06F 16/2379 |

OTHER PUBLICATIONS

A. Vaswani et al., "Attention Is All You Need," arXiv:1706.03762v5, 31st Conference on Neural Information Processing Systems, Dec. 6, 2017, 15 pages.

G. Neubig, "Neural Machine Translation and Sequence-to-sequence Models: A Tutorial," arXiv:1703.01619v1, Mar. 5, 2017, 65 pages.

S. Mani et al., "DeepTriage: Exploring the Effectiveness of Deep Learning for Bug Triaging," arXiv:1801.01275v1, Jan. 4, 2018, 11 pages.

T. Mikolov et al., "Efficient Estimation of Word Representations in Vector Space," arXiv:1301.3781 v3, Sep. 7, 2013, 12 pages.

* cited by examiner

200 ↘

| Abstract | Detailed description | Identification of solution |
|---|---|---|
| Going to smartfail these nodes below, starting with node9... | About restriping works of SetProtectPlus ... | NA |
| ... | ... | ... |
| When trying to delete the file via GUI, it crashes the computer in question's explorer.exe service... | Attempts to open multiple files on different shares results in host system crash and Isilon hangs (locally)... | NA |
| Isilon cluster MLISLN1CLU02, node 9, s/n - SN400-201350-0079... | Requeue | CE Onsite Isilon cluster MLISLN1CLU02, Unhealthy boot disks (ada1), mirror is degraded or missing components... | 466200 |
| ... | ... | ... |
| Need to create storage compatibilities class for n400 and n410... | Need to create storage compatibilities class for n400 and n410... | 479567 |

FIG. 2

METHOD, ELECTRONIC DEVICE, AND COMPUTER PROGRAM PRODUCT FOR PROCESSING INFORMATION

RELATED APPLICATION(S)

The present application claims priority to Chinese Patent Application No. 202010621888.6, filed Jun. 30, 2020, and entitled "Method, Electronic Device, and Computer Program Product for Processing Information," which is incorporated by reference herein in its entirety.

FIELD

Embodiments of the present disclosure generally relate to the field of information processing, and in particular, to a method, an electronic device, and a computer program product for processing information.

BACKGROUND

With the development of information technologies, the number of companies providing information services is increasing. Especially for companies that provide large-scale and complex information services, users are likely to encounter a variety of problems when using the information services provided by such companies. The problems may be caused by software defects, hardware or network problems, or operational errors. To this end, a team of technical support engineers needs to deal with a large number of service requests relevant to problem reporting. However, it is a difficult task to quickly and efficiently find a solution or relevant information of a solution that may solve a problem reported in a service request.

SUMMARY

A method, an electronic device, and a computer program product for processing information are provided in embodiments of the present disclosure.

In a first aspect of the present disclosure, a method for processing information is provided. The method includes: acquiring a service request record set, each service request record in the service request record set relating to a problem encountered by a user when the user is provided with a service and a solution to the problem; constructing a language model based on a first subset in the service request record set and an initial model, the initial model being trained using a predetermined corpus and configured to determine vector representations of words and sentences in the corpus; and constructing a classification model based on a second subset in the service request record set and the language model, the classification model being capable of determining a solution to a pending problem, and the first subset being different from the second subset.

In a second aspect of the present disclosure, an electronic device is provided. The device includes at least one processing unit and at least one memory. The at least one memory is coupled to the at least one processing unit and stores instructions configured to be executed by the at least one processing unit. When executed by the at least one processing unit, the instructions cause the device to perform actions including: acquiring a service request record set, each service request record in the service request record set relating to a problem encountered by a user when the user is provided with a service and a solution to the problem; constructing a language model based on a first subset in the service request record set and an initial model, the initial model being trained using a predetermined corpus and configured to determine vector representations of words and sentences in the corpus; and constructing a classification model based on a second subset in the service request record set and the language model, the classification model being capable of determining a solution to a pending problem, and the first subset being different from the second subset.

In a third aspect of the present disclosure, a computer program product is provided. The computer program product is tangibly stored on a non-transitory computer-readable medium and includes machine-executable instructions; and when executed, the machine-executable instructions cause a machine to perform any steps of the method described according to the first aspect of the present disclosure.

This Summary is provided in a simplified form to introduce the selection of concepts, which will be further described in the Detailed Description below. The Summary is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

FIG. 2 is a schematic diagram of an example of service request records according to some embodiments of the present disclosure;

In the accompanying drawings, the same or corresponding numerals represent the same or corresponding parts.

DETAILED DESCRIPTION

Figure 1:
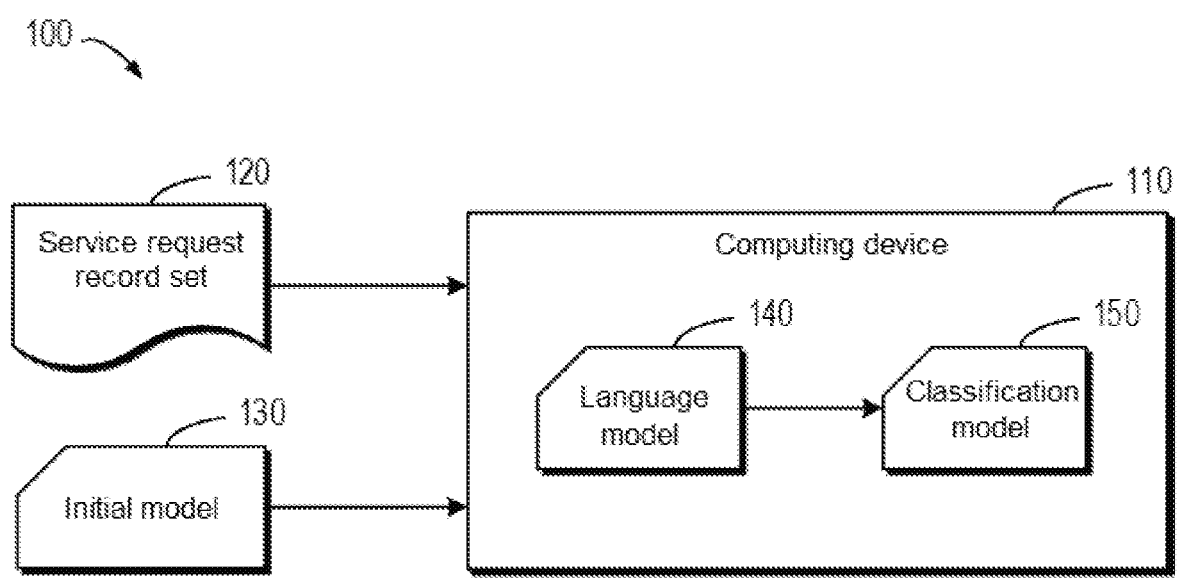
FIG. 1 is a schematic diagram of an example environment in which some embodiments of the present disclosure can be implemented.

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, for example, "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Conventionally, as described above, a team of technical support engineers of a company providing information services needs to deal with a large number of service requests relevant to problem reporting. In order to improve efficiency and provide assistance to other engineers, problem-solving engineers may generally summarize and record processes of fixing and solving common problems. For this reason, when a problem reported in a service request is fixed and solved, information about a solution to the problem may be stored in a service request record. In some cases, processes for fixing and solving various types of problems may be formed as a variety of knowledge bases.

However, in most teams of technical support engineers, team members generally have different levels of experience, and junior engineers are much less efficient than senior engineers. For this reason, it is a difficult task to help engineers to quickly and efficiently find a solution or relevant information of a solution that may solve a problem reported in a service request.

According to an example embodiment of the present disclosure, an improved solution is proposed. In the solution, a service request record set may be acquired, and a language model may be constructed based on a first subset in the service request record set and an initial model. Each service request record in the service request record set relates to a problem encountered by a user when the user is provided with a service and a solution to the problem. The initial model is trained using a predetermined corpus and is configured to determine vector representations of words and sentences in the corpus. Further, a classification model may be constructed based on a second subset in the service request record set and the language model, the second subset being different from the first subset. The classification model is capable of determining a solution to a pending problem.

In this way, this solution can quickly and efficiently determine solutions to problems reported in service requests, thereby improving the efficiency of solving the problems by engineers and improving the user experience.

In the following, specific examples of this solution will be described in more detail with reference to FIG. 1 to FIG. 9. FIG. 1 is a schematic diagram of example environment 100 according to some embodiments of the present disclosure. Environment 100 includes computing device 110. Computing device 110 may acquire service request record set 120 and initial model 130. Service request record set 120 includes a plurality of service request records. Each service request record includes a problem encountered by a user when the user is provided with a service and a solution to the problem. In some embodiments, the solution may also be a knowledge base including the solution or relevant knowledge of the solution.

FIG. 2 is a schematic diagram of an example of service request record 200 according to some embodiments of the present disclosure. As shown in FIG. 2, service request record 200 includes abstract 210 of the problem, detailed description 220 of the problem, and identification 230 of a solution to the problem. For example, abstract 210 of the problem and detailed description 220 of the problem may each be a combination of unstructured text including a plurality of words, such as customer descriptions, system logs, memory dump files, performance statistical information, and stack traces. In some cases, service request record 200 stores valid identification 230 of a solution, for example, a name, a number, an index, an address, or the like of the solution. However, in some cases, identification 230 of the solution stored in service request record 200 may be invalid and may be represented by a predetermined value (for example, "NA").

Referring back to FIG. 1, initial model 130 may be obtained by training a base model by using a predetermined corpus, and is configured to determine vector representations of words and sentences in the corpus. The base model may be implemented through a transformer model, a recurrent neural network (RNN), or a long short-term memory (LSTM) network.

Computing device 110 may construct language model 140 based on a subset (hereinafter referred to as a "first subset") in service request record set 120 and initial model 130. Further, computing device 110 may construct classification model 150 based on another subset (hereinafter referred to as a "second subset") in service request record set 120 and language model 140. Classification model 150 is capable of determining a solution to a pending problem. Thus, when receiving a new service request, computing device 110 may apply the new service request to classification model 150 to quickly and efficiently determine a solution of the pending problem that is reported in the new service request. Therefore, the problem solving efficiency and user experience can be improved.

Figure 3:
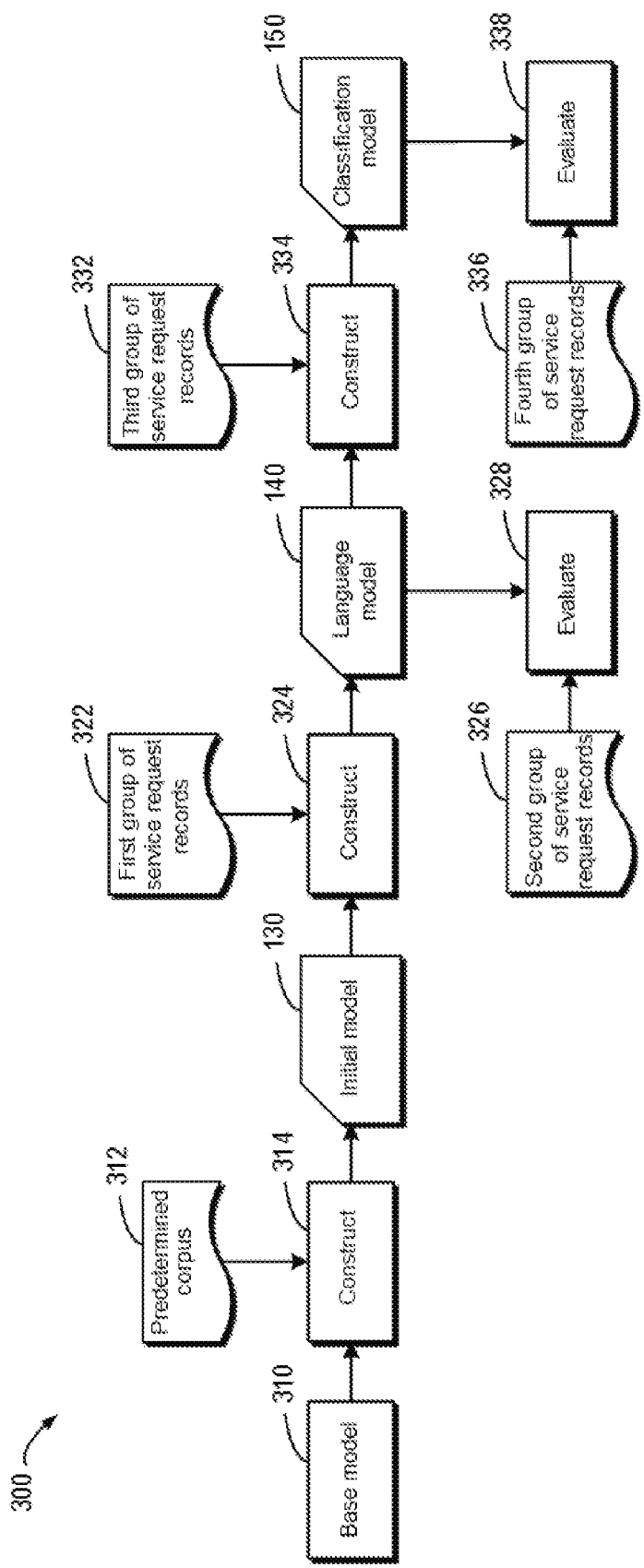
FIG. 3 is a schematic diagram of an example of a process for constructing an initial model, a language model, and a classification model according to some embodiments of the present disclosure.

In the following, operations performed by computing device 110 are described in more detail with reference to FIG. 3 to FIG. 6. FIG. 3 is a schematic diagram of an example of process 300 for constructing an initial model, a language model, and a classification model according to some embodiments of the present disclosure. For example, process 300 may be performed by computing device 110 as shown in FIG. 1. It should be understood that process 300 may further include additional steps not shown and/or may skip the steps shown, and that the scope of the present disclosure is not limited in this respect.

As described above, computing device 110 may acquire initial model 130. Initial model 130 may be constructed 314 by training base model 310 by using predetermined corpus 312, and may be configured to determine vector representations of words and sentences in predetermined corpus 312. For example, initial model 130 may output a vector representing a predetermined size (for example, 50 dimensions) of words.

In some embodiments, construction 314 of initial model 130 may be performed by computing device 110. Alternatively, construction 314 may also be performed by other subjects. Base model 310 may be implemented through a transformer model, a recurrent neural network (RNN), or a long and short-term memory (LSTM) network. Predetermined corpus 312 may be a corpus with a large number of words and sentences, for example, a Wikipedia corpus, a book corpus, and the like.

Figure 4:
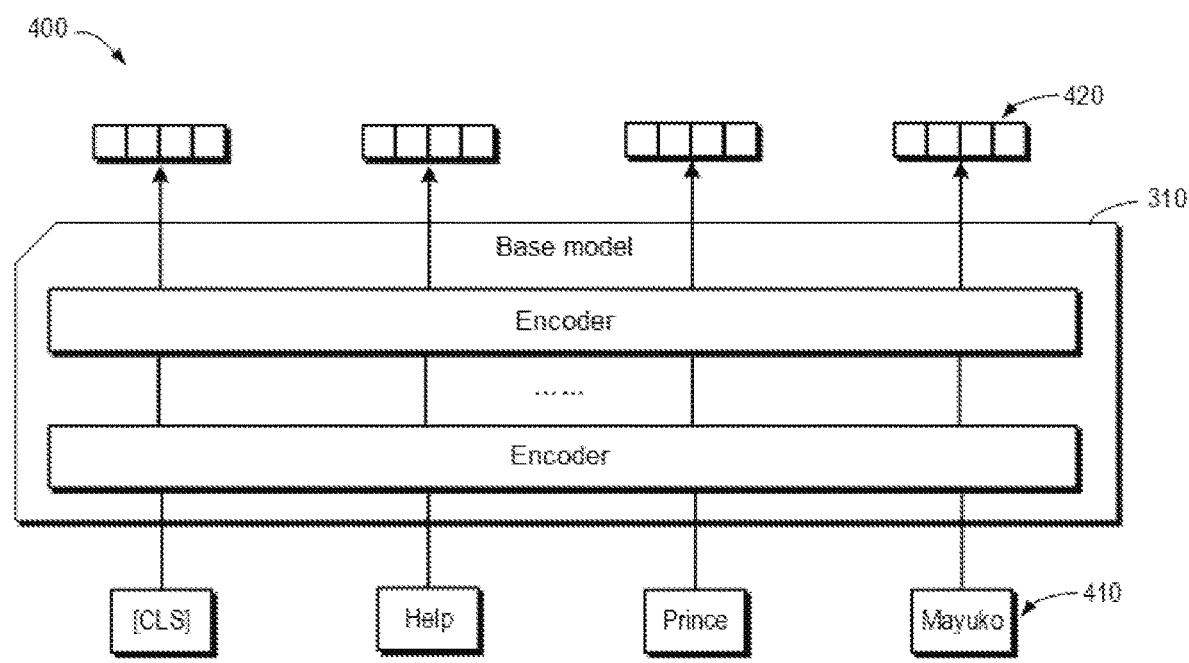
FIG. 4 is a schematic diagram of an example of a base model according to some embodiments of the present disclosure.

FIG. 4 is schematic diagram 400 of an example of base model 310 according to some embodiments of the present disclosure. For example, base model 310 is implemented through the transformer model, and base model 310 includes a plurality of stacked encoders (for example, 12) of the transformer model. The transformer model is an attention mechanism for learning a contextual relationship between words in text. The number of the stacked encoders determines the number of parameters of base model 310. Since the encoder reads a plurality of words, it may be considered bidirectional. This feature enables base model 310 to learn a context of a word based on a surrounding environment of the word (for example, other words near the word).

As shown in FIG. 4, the input to base model 310 is a plurality of words 410 as tags. It should be understood that the number of words 410 shown in FIG. 4 is merely an example, and in each iteration (for example, in each epoch), any suitable number of words may be input, for example, 128 words, 256 words, 512 words, and so on.

In some embodiments, input words 410 may begin with a predetermined word (for example, "[CLS]"), and sentences may also be separated by a predetermined word (for example, "[SEP]") (not shown). Words 410 are first converted into vectors and then processed in stacked encoders. The output from base model 310 is a plurality of vector representations 420 of a predetermined size, and each of the plurality of vector representations 420 corresponds to a word 410 at the same position. A vector representation corresponding to a predetermined word (for example, "[CLS]") at the beginning may be recognized as a vector representation of a sentence.

Referring back to FIG. 3, in order to train base model 310 to initial model 130 by using predetermined corpus 312, during construction 314 stage, two strategies, namely, masked language model (MLM) and next sentence prediction (NSP), may be used.

In the MLM strategy, some of a plurality of words are replaced with a predetermined word (for example, "[MASK]"), and the plurality of words are input to base model 310 for training. In some embodiments, a predetermined proportion (for example, 15%) of the words may be replaced. Such a replacement process may also be considered as a process of masking words by using a predetermined word. Base model 310 may attempt to predict masked words based on a context provided by other words that are not masked. For example, a probability that each word in predetermined corpus 312 is a masked word may be calculated by using a softmax function. Base model 310 is trained by adjusting parameters of base model 310 so that the predicted words are close to actual masked words.

In addition, in the NSP strategy, base model 310 receives paired sentences as an input, and attempts to predict whether a second sentence in the paired sentences is a subsequent sentence in a context in which a first sentence is located. To this end, it needs to add a classification layer to an output generated for the predetermined word (for example, "[CLS]") at the beginning by base model 310, so as to predict whether the second sentence is a subsequent sentence (for example, classified as "true" or "false"). Base model 310 is trained by adjusting parameters of base model 310 so that a prediction result is close to an actual result.

The construction of initial model 130 has been described above. It should be understood that since the initial model 130 is constructed using predetermined corpus 312 with a large number of words and sentences, in the subsequent process, language model 140 may be constructed and classification model 150 may be generated by using only a service request record set with fewer words and sentences to fine-tune initial model 130. Thus, the accuracy of the solution determined by classification model 150 is improved.

Computing device 110 may acquire initial model 130 and service request record set 120, and construct 324 language model 140 based on a first subset in service request record set 120 and initial model 130. Specifically, in some embodiments, computing device 110 may determine the first subset from service request record set 120. An identification of a solution in each service request record in the first subset is an invalid identification (for example, "NA").

Computing device 110 may divide, based on a generation time of each service request record in the first subset, the first subset into first group of service request records 322 configured to construct 324 language model 140 and second group of service request records 326 configured to evaluate 328 language model 140. For example, service request records whose generation time is earlier than a threshold time may be used as first group of service request records 322, and service request records whose generation time is later than the threshold time may be used as second group of service request records 326.

Accordingly, computing device 110 may construct 324 language model 140 based on initial model 130 by using first group of service request records 322, and may evaluate 328 language model 140 by using second group of service request records 326. For example, in order to construct 324 language model 140, computing device 110 may replace at least one word in each service request record in first group of service request records 322 with at least one predetermined word (for example, "[MASK]") to generate a first group of replaced service request records. In addition, computing device 110 may construct language model 140 by applying the first group of replaced service request records to initial model 130. In some embodiments, a predetermined proportion (for example, 15%) of the words may be replaced.

Such a replacement process may also be considered as a process of masking words by using a predetermined word. Initial model 130 may attempt to predict masked words based on a context provided by other words that are not masked. For example, a probability that each word in first group of service request records 322 is a masked word may be calculated by using a softmax function. Language model 140 is constructed 324 by adjusting parameters of initial model 130 so that the predicted words are close to actual masked words.

Figure 5:
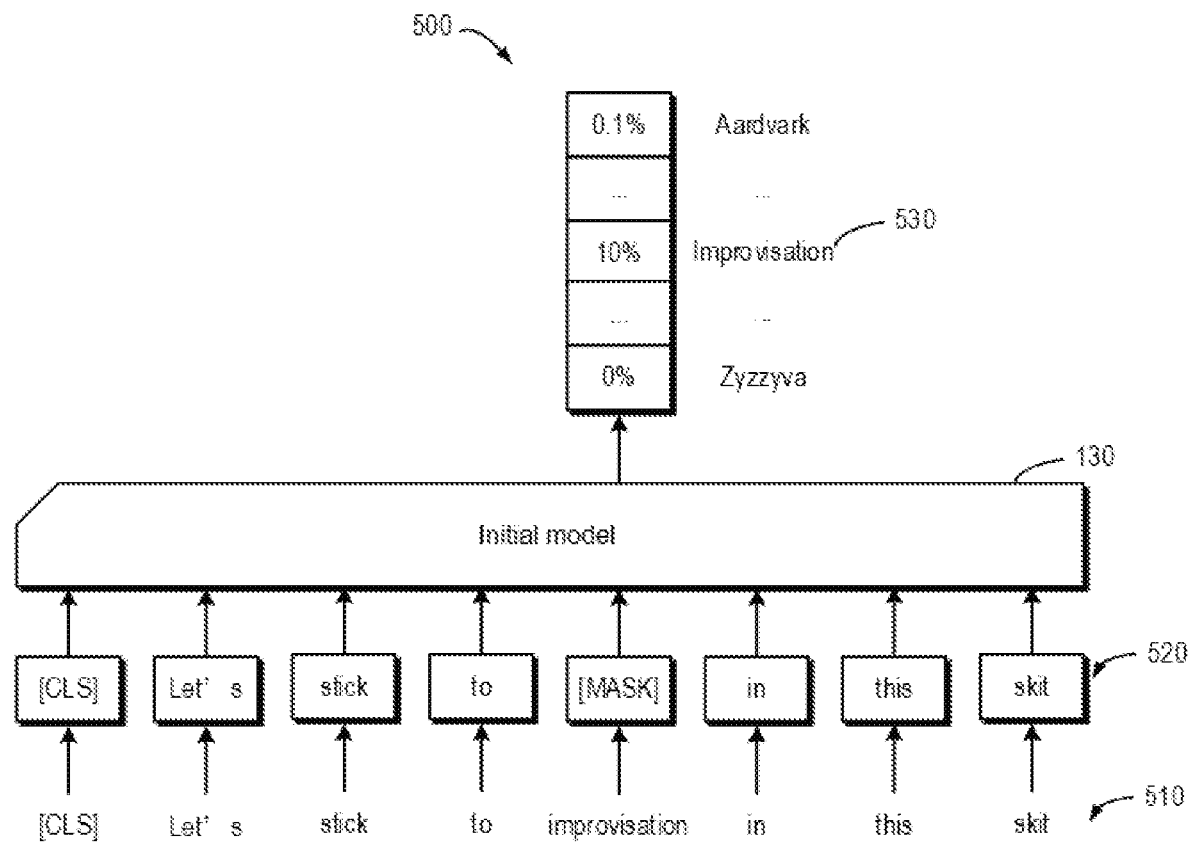
FIG. 5 is a schematic diagram of an example of a process for constructing a language model according to some embodiments of the present disclosure.

FIG. 5 is schematic diagram 500 of an example of a process for constructing 324 language model 140 according to some embodiments of the present disclosure. The input to initial model 130 is a plurality of words 520 as tags. Compared with actual words 510, the word "improvisation" is replaced with the predetermined word "[MASK]." It should be understood that the number of words 520 shown in FIG. 5 is merely an example, and in each iteration (for example, in each epoch), any suitable number of words may be input, for example, 128 words, 256 words, 512 words, and so on.

Input words 520 may begin with a predetermined word (for example, "[CLS]"), and sentences may also be separated by a predetermined word (for example, "[SEP]") (not shown). In some embodiments, words 520 may be converted into vectors and then processed in initial model 130. The output 530 of initial model 130 is a probability that each word in first group of service request records 322 is a masked word. As shown in FIG. 5, a probability that the word "Aardvark" is a masked word is 0.1%, a probability that the word "Improvisation" is a masked word is 10%, and a probability that the word "Zyzzyva" is a masked word is 0%.

Furthermore, in order to evaluate 328 language model 140, computing device 110 may replace at least one word in each service request record in second group of service request records 326 with at least one predetermined word (for example, "[MASK]") to generate a second group of replaced service request records. In addition, computing device 110 may apply the second group of replaced service request records to language model 140 to determine at least one prediction result of the at least one word. Computing device 110 may determine a probability that at least one prediction result matches at least one word, and evaluate 328 language model 140 based on the probability.

Alternatively, computing device 110 may use a perplexity as an index for evaluating 328 language model 140. A lower perplexity indicates a better performance of the model. Through the perplexity index, it may be found that, compared with initial model 130, the perplexity of language model 140 is significantly lower than that of initial model 130.

The construction and evaluation of language model 140 have been described above. Computing device 110 may further construct 334 and evaluate 338 classification model 150 based on language model 140. In some embodiments, computing device 110 may determine the second subset from service request record set 120. An identification of a solution in each service request record in the second subset is a valid identification. The valid identification may indicate a name, a number, an index, an address, and the like of the solution.

Computing device 110 may divide, based on a generation time of each service request record in the second subset, the second subset into third group of service request records 332 configured to construct classification model 150 and fourth group of service request records 336 configured to evaluate classification model 150. For example, service request records whose generation time is earlier than a threshold time may be used as third group of service request records 332, and service request records whose generation time is later than the threshold time may be used as fourth group of service request records 336.

Figure 6:
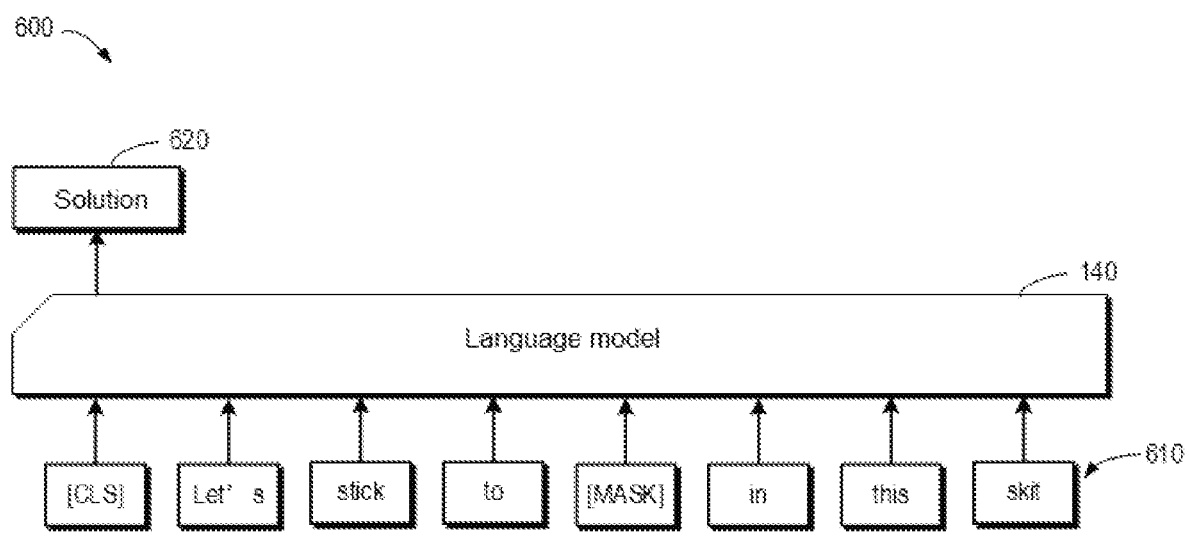
FIG. 6 is a schematic diagram of an example of a process for constructing a classification model according to some embodiments of the present disclosure.

Accordingly, computing device 110 may construct 334 classification model 150 by using third group of service request records 332, and may evaluate 338 language model 140 by using fourth group of service request records 336. FIG. 6 is schematic diagram 600 of an example of a process for constructing 334 classification model 150 according to some embodiments of the present disclosure.

For example, in order to construct 334 classification model 150, language model 140 receives a plurality of words 610 from a service request record in third group of service request records 332 as an input, and attempts to predict solution 620 for the service request record. It should be understood that the number of words 610 shown in FIG. 6 is merely an example, and in each iteration (for example, in each epoch), any suitable number of words may be input, for example, 128 words, 256 words, 512 words, and so on.

To this end, in some embodiments, a classification layer may be added to an output generated for the predetermined word (for example, "[CLS]") at the beginning by language model 140, so as to predict a solution. Classification model 150 is constructed 334 by adjusting parameters of language model 140 so that a prediction result is close to an actual result.

Further, in order to evaluate 338 classification model 150, computing device 110 may apply fourth group of service request records 336 to classification model 150 to obtain a predicted solution, and determine a probability that the predicted solution matches an actual solution indicated by the identification. Thus, computing device 110 may evaluate classification model 150 based on the probability.

Alternatively, computing device 110 may use a perplexity as an index for evaluating 338 classification model 150. For example, a perplexity of the top one prediction result and a perplexity of top N prediction results may be adopted, where N is a natural number greater than 1. The perplexity of the top one prediction result indicates a maximum probability of an output by classification model 150. The maximum probability represents a confidence of the predicted solution. The perplexity of the top N prediction results indicates a frequency at which an actual solution falls into predicted solutions with top N maximum probabilities output by classification model 150.

Figure 7:
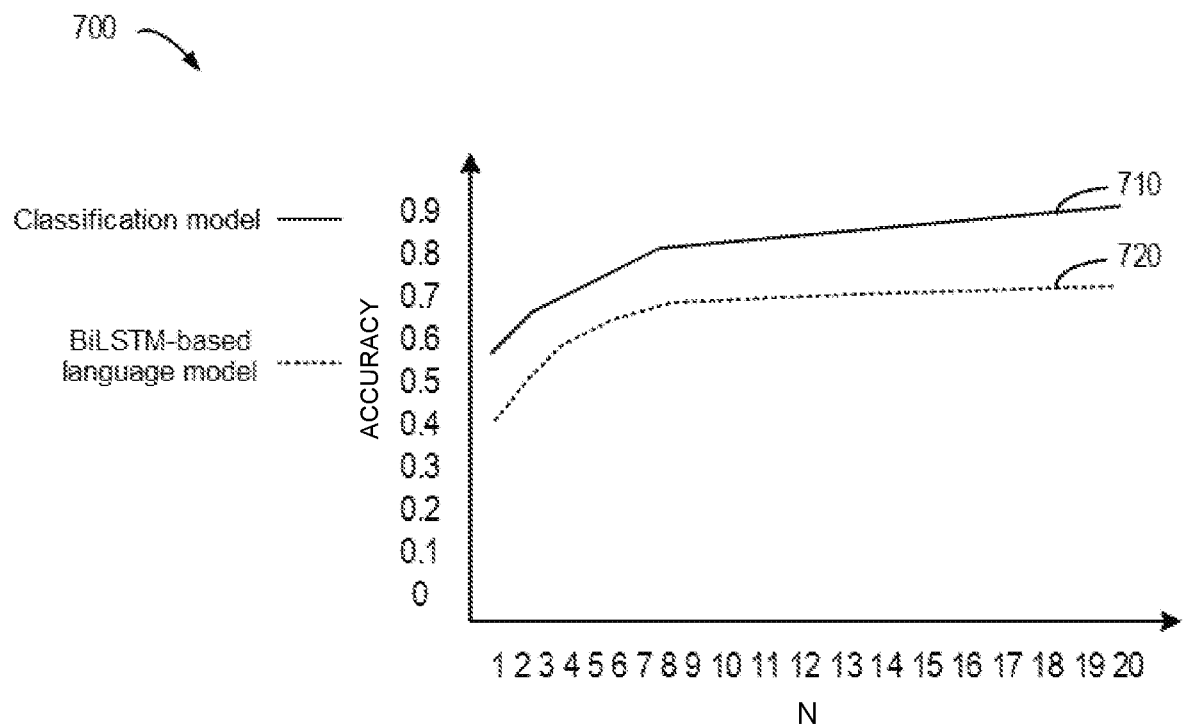
FIG. 7 is a schematic diagram of an example of comparison between a classification model and a bidirectional long short-term memory (BiLSTM) language model according to some embodiments of the present disclosure.

Through the perplexity index, it may be found that the accuracy of classification model 150 is significantly higher than that of a bidirectional long short-term memory (BiLSTM) language model. FIG. 7 is a schematic diagram of an example of comparison 700 between classification model 710 and a bidirectional long short-term memory (BiLSTM) language model 720 according to some embodiments of the present disclosure. As shown in FIG. 7, in terms of the accuracy of top N prediction results, where $1 \leq N \leq 20$, classification model 710 exhibits a lower perplexity, and thus a higher accuracy, than the bidirectional long short-term memory (BiLSTM) language model 720.

In this way, this solution can quickly and efficiently determine solutions to problems reported in service requests, thereby improving the efficiency of solving the problems by engineers and improving the user experience.

Figure 8:
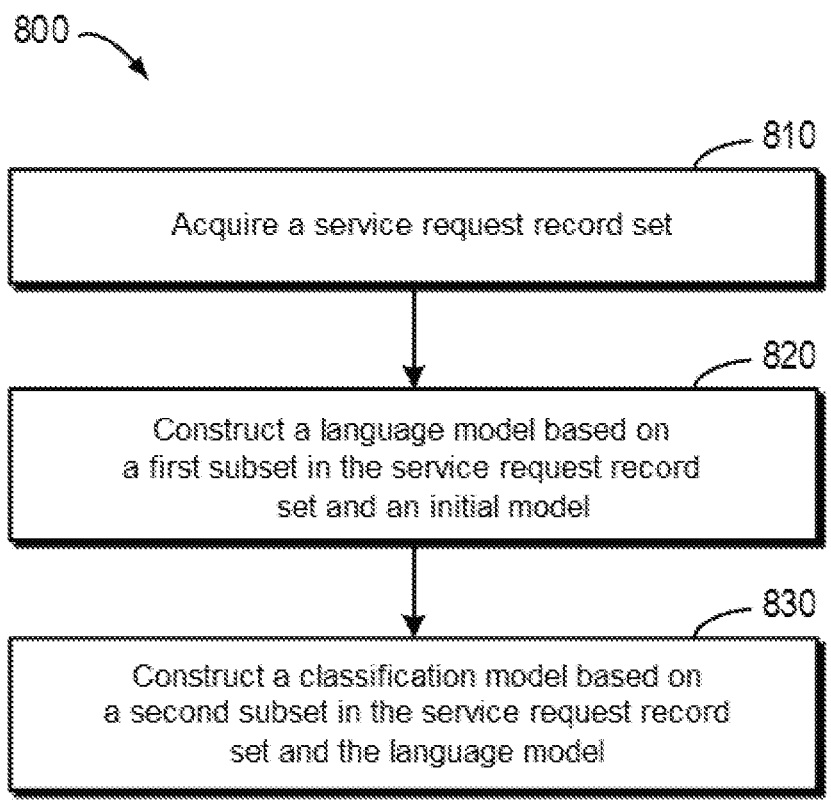
FIG. 8 is a flowchart of a method for constructing a classification model according to some embodiments of the present disclosure.

FIG. 8 is a flowchart of method 800 according to some embodiments of the present disclosure. For example, method 800 may be performed by computing device 110 as shown in FIG. 1. It should be understood that method 800 may further include additional steps not shown and/or may skip the steps shown, and that the scope of the present disclosure is not limited in this respect.

In 810, computing device 110 acquires a service request record set. Each service request record in the service request record set relates to a problem encountered by a user when the user is provided with a service and a solution to the problem. In 820, computing device 110 constructs a language model based on a first subset in the service request record set and an initial model. The initial model is trained by using a predetermined corpus and is configured to determine vector representations of words and sentences in the corpus. In 830, computing device 110 constructs a classification model based on a second subset in the service request record set and the language model. The classification model is capable of determining a solution to a pending problem. The first subset is different from the second subset.

In some embodiments, each service request record in the service request record set includes: an abstract of the problem including a plurality of words, a detailed description of the problem including a plurality of words, and an identification of a solution to the problem.

In some embodiments, in order to construct the language model, computing device 110 may determine the first subset from the service request record set. An identification of a solution in each service request record in the first subset is an invalid identification. Computing device 110 may divide, based on a generation time of each service request record in the first subset, the first subset into a first group of service request records configured to construct the language model and a second group of service request records configured to evaluate the language model. Thus, computing device 110 may construct the language model based on the initial model by using the first group of service request records.

In some embodiments, in order to construct the language model based on the initial model, computing device 110 may replace at least one word in each service request record in the first group of service request records with at least one predetermined word to generate a first group of replaced service request records. Thus, computing device 110 may construct the language model by applying the first group of replaced service request records to the initial model.

For example, computing device 110 may replace at least one word in each service request record in the second group of service request records with at least one predetermined word to generate a second group of replaced service request records. Computing device 110 may apply the second group of replaced service request records to the language model to determine at least one prediction result of the at least one word. Computing device 110 may determine a probability that at least one prediction result matches at least one word. Thus, computing device 110 may evaluate the classification model based on the probability.

In some embodiments, in order to construct the language model, computing device 110 may determine the second subset from the service request record set. An identification of a solution in each service request record in the second subset is a valid identification. Computing device 110 may divide, based on a generation time of each service request record in the second subset, the second subset into a third group of service request records configured to construct the classification model and a fourth group of service request records configured to evaluate the classification model. Thus, computing device 110 may construct the classification model by using the third group of service request records.

In some embodiments, computing device 110 may apply the fourth group of service request records to the classification model to obtain a predicted solution. Computing device 110 may determine a probability that the predicted solution matches the solution indicated by the identification. Thus, computing device 110 may evaluate the classification model based on the probability.

Figure 9:
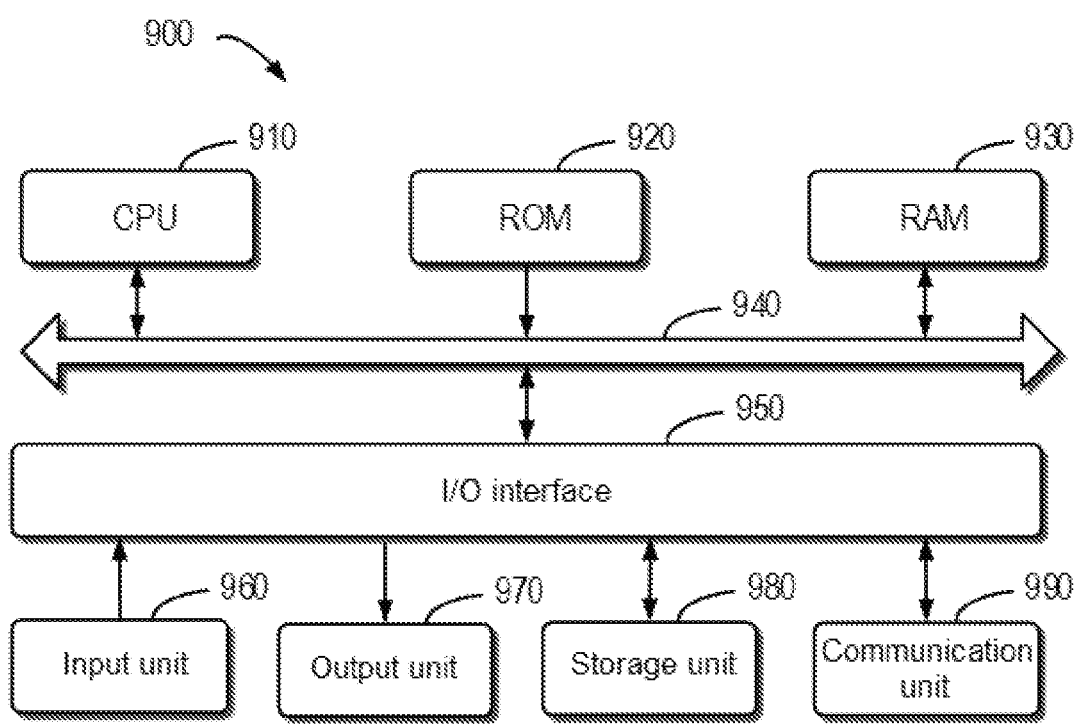
FIG. 9 is a schematic block diagram of an example device that can be configured to implement an embodiment of content of the present disclosure.

FIG. 9 is a schematic block diagram of example device 900 that can be configured to implement an embodiment of content of the present disclosure. For example, computing device 110 as shown in FIG. 1 may be implemented by device 900. As shown in the figure, device 900 includes central processing unit (CPU) 910 that may perform various appropriate actions and processing according to computer program instructions stored in read-only memory (ROM) 920 or computer program instructions loaded from storage unit 980 to random access memory (RAM) 930. In RAM 930, various programs and data required for the operation of device 900 may also be stored. CPU 910, ROM 920, and RAM 930 are connected to each other through bus 940. Input/output (I/O) interface 950 is also connected to bus 940.

A plurality of components in device 900 are coupled to I/O interface 950, including: input unit 960, such as a keyboard and a mouse; output unit 970, such as various types of displays and speakers; storage unit 980, such as a magnetic disk and an optical disc; and communication unit 990, such as a network card, a modem, and a wireless communication transceiver. Communication unit 990 allows device 900 to exchange information/data with other devices over a computer network such as the Internet and/or various telecommunication networks.

Various processes and processing described above, for example, processes 300 and 800, can be performed by CPU 910. For example, in some embodiments, processes 300 and 800 may be implemented as a computer software program that is tangibly included in a machine-readable medium, for example, storage unit 980. In some embodiments, part or all of the computer program may be loaded and/or installed on device 900 via ROM 920 and/or communication unit 990. When the computer program is loaded into RAM 930 and executed by CPU 910, one or more actions of processes 300 and 800 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (the system), and the computer program product according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of the blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms used herein is intended to best explain the principles and practical applications of the embodiments or the technological improvements to technologies on the market, and to otherwise enable those of ordinary skill in the art to understand the embodiments disclosed herein.

What is claimed is:

1. A method for processing information, comprising:
   acquiring a service request record set, each service request record in the service request record set relating to a problem encountered by a user when the user is provided with a service and a solution to the problem;
   constructing a language model based on a first subset in the service request record set and an initial model, the initial model being trained using a predetermined corpus and configured to determine vector representations of words and sentences in the corpus; and
   constructing a classification model based on a second subset in the service request record set and the language model, the classification model being capable of determining a solution to a pending problem, and the first subset being different from the second subset.

2. The method of claim 1, wherein each service request record in the service request record set comprises:
   an abstract of the problem comprising a plurality of words,
   a detailed description of the problem comprising a plurality of words, and
   an identification of the solution to the problem.

3. The method of claim 1, wherein constructing the language model comprises:
   determining the first subset from the service request record set, an identification of a solution in each service request record in the first subset being an invalid identification;
   dividing, based on a generation time of each service request record in the first subset, the first subset into a first group of service request records configured to construct the language model and a second group of service request records configured to evaluate the language model; and
   constructing the language model based on the initial model by using the first group of service request records.

4. The method of claim 3, wherein constructing the language model based on the initial model comprises:
   replacing at least one word in each service request record in the first group of service request records with at least one predetermined word to generate a first group of replaced service request records; and constructing the language model by applying the first group of replaced service request records to the initial model.

5. The method of claim 3, further comprising:
replacing at least one word in each service request record in the second group of service request records with at least one predetermined word to generate a second group of replaced service request records;
applying the second group of replaced service request records to the language model to determine at least one prediction result of the at least one word;
determining a probability that the at least one prediction result matches the at least one word; and
evaluating the language model based on the probability.

6. The method of claim 1, wherein constructing the classification model comprises:
determining the second subset from the service request record set, an identification of a solution in each service request record in the second subset being a valid identification;
dividing, based on a generation time of each service request record in the second subset, the second subset into a third group of service request records configured to construct the classification model and a fourth group of service request records configured to evaluate the classification model; and
constructing the classification model by using the third group of service request records.

7. The method of claim 6, further comprising:
applying the fourth group of service request records to the classification model to obtain a predicted solution;
determining a probability that the predicted solution matches the solution indicated by the identification; and
evaluating the classification model based on the probability.

8. An electronic device, comprising:
at least one processing unit; and
at least one memory coupled to the at least one processing unit and storing instructions configured to be executed by the at least one processing unit, wherein when executed by the at least one processing unit, the instructions cause the device to perform actions comprising:
acquiring a service request record set, each service request record in the service request record set relating to a problem encountered by a user when the user is provided with a service and a solution to the problem;
constructing a language model based on a first subset in the service request record set and an initial model, the initial model being trained using a predetermined corpus and configured to determine vector representations of words and sentences in the corpus; and
constructing a classification model based on a second subset in the service request record set and the language model, the classification model being capable of determining a solution to a pending problem, and the first subset being different from the second subset.

9. The device of claim 8, wherein each service request record in the service request record set comprises:
an abstract of the problem comprising a plurality of words,
a detailed description of the problem comprising a plurality of words, and
an identification of the solution to the problem.

10. The device of claim 8, wherein constructing the language model comprises:
determining the first subset from the service request record set, an identification of a solution in each service request record in the first subset being an invalid identification;
dividing, based on a generation time in each service request record in the first subset, the first subset into a first group of service request records configured to construct the language model and a second group of service request records configured to evaluate the language model; and
constructing the language model based on the initial model by using the first group of service request records.

11. The device of claim 10, wherein constructing the language model based on the initial model comprises:
replacing at least one word in each service request record in the first group of service request records with at least one predetermined word to generate a first group of replaced service request records; and
constructing the language model by applying the first group of replaced service request records to the initial model.

12. The device of claim 10, wherein the actions further comprise:
replacing at least one word in each service request record in the second group of service request records with at least one predetermined word to generate a second group of replaced service request records;
applying the second group of replaced service request records to the language model to determine at least one prediction result of the at least one word;
determining a probability that the at least one prediction result matches the at least one word; and
evaluating the language model based on the probability.

13. The device of claim 8, wherein constructing the classification model comprises:
determining the second subset from the service request record set, an identification of a solution in each service request record in the second subset being a valid identification;
dividing, based on a generation time of each service request record in the second subset, the second subset into a third group of service request records configured to construct the classification model and a fourth group of service request records configured to evaluate the classification model; and
constructing the classification model by using the third group of service request records.

14. The device of claim 13, wherein the actions further comprise:
applying the fourth group of service request records to the classification model to obtain a predicted solution;
determining a probability that the predicted solution matches the solution indicated by the identification; and
evaluating the classification model based on the probability.

15. A computer program product tangibly stored in a non-transitory computer-readable medium and comprising machine-executable instructions, wherein when executed, the machine-executable instructions cause a machine to perform steps of a method for processing information, the method comprising:
acquiring a service request record set, each service request record in the service request record set relating to a problem encountered by a user when the user is provided with a service and a solution to the problem;

constructing a language model based on a first subset in the service request record set and an initial model, the initial model being trained using a predetermined corpus and configured to determine vector representations of words and sentences in the corpus; and constructing a classification model based on a second subset in the service request record set and the language model, the classification model being capable of determining a solution to a pending problem, and the first subset being different from the second subset.

16. The computer program product of claim 15, wherein each service request record in the service request record set comprises:

an abstract of the problem comprising a plurality of words, a detailed description of the problem comprising a plurality of words, and an identification of the solution to the problem.

17. The computer program product of claim 15, wherein constructing the language model comprises:

determining the first subset from the service request record set, an identification of a solution in each service request record in the first subset being an invalid identification;

dividing, based on a generation time of each service request record in the first subset, the first subset into a first group of service request records configured to construct the language model and a second group of service request records configured to evaluate the language model; and constructing the language model based on the initial model by using the first group of service request records.

18. The computer program product of claim 17, wherein constructing the language model based on the initial model comprises:

replacing at least one word in each service request record in the first group of service request records with at least one predetermined word to generate a first group of replaced service request records; and constructing the language model by applying the first group of replaced service request records to the initial model.

19. The computer program product of claim 17, further comprising:

replacing at least one word in each service request record in the second group of service request records with at least one predetermined word to generate a second group of replaced service request records;

applying the second group of replaced service request records to the language model to determine at least one prediction result of the at least one word;

determining a probability that the at least one prediction result matches the at least one word; and evaluating the language model based on the probability.

20. The computer program product of claim 15, wherein constructing the classification model comprises:

determining the second subset from the service request record set, an identification of a solution in each service request record in the second subset being a valid identification;

dividing, based on a generation time of each service request record in the second subset, the second subset into a third group of service request records configured to construct the classification model and a fourth group of service request records configured to evaluate the classification model; and constructing the classification model by using the third group of service request records.

* * * * *